United States Patent
Lai

(10) Patent No.: US 9,003,174 B2
(45) Date of Patent: Apr. 7, 2015

(54) METHOD FOR BOOSTING AN ELECTRONIC DEVICE WITH MULTIPLE PROCESSING UNITS, AND ELECTRONIC DEVICE FOR IMPLEMENTING THE SAME

(75) Inventor: Cheng-Chia Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 405 days.

(21) Appl. No.: 13/071,085

(22) Filed: Mar. 24, 2011

(65) Prior Publication Data

US 2011/0246759 A1 Oct. 6, 2011

(30) Foreign Application Priority Data

Mar. 31, 2010 (TW) ................................ 99109875 A

(51) Int. Cl.
*G06F 9/00* (2006.01)
*G06F 9/44* (2006.01)

(52) U.S. Cl.
CPC ............ *G06F 9/4405* (2013.01); *G06F 9/4401* (2013.01)

(58) Field of Classification Search
CPC ....................................................... G06F 9/4406
USPC .......................................................... 713/2, 1
See application file for complete search history.

(56) References Cited

U.S. PATENT DOCUMENTS

| 7,900,035 | B2 | 3/2011 | Yoshida et al. | |
|---|---|---|---|---|
| 2005/0289286 | A1 | 12/2005 | Ohwada | 711/1 |
| 2008/0040599 | A1* | 2/2008 | Yoshida et al. | 713/2 |
| 2008/0077786 | A1* | 3/2008 | Pierce et al. | 713/2 |
| 2009/0271604 | A1* | 10/2009 | Jang | 713/2 |
| 2011/0010714 | A1* | 1/2011 | Powell et al. | 718/1 |

FOREIGN PATENT DOCUMENTS

| CN | 1567187 A | 1/2005 |
|---|---|---|
| CN | 101123686 | 2/2008 |
| CN | 101604252 A | 12/2009 |

OTHER PUBLICATIONS

Office Action for Chinese Patent Application No. 201010141295.6, dated Mar. 27, 2013, and an English summary provided by the Applicant.
Office action dated Dec. 2, 2013 from corresponding Chinese Patent Application No. 201010141295.6 and its English summary provided by the clients.

* cited by examiner

*Primary Examiner* — Jaweed A Abbaszadeh
*Assistant Examiner* — Alyaa T Mazyad
(74) *Attorney, Agent, or Firm* — Ladas & Parry, LLP

(57) ABSTRACT

A method for reducing booting time is to be implemented by an electronic device including first and second processing units, a cache memory, and a storage medium. The method includes the steps of: configuring the first processing unit for executing a set of program instructions for initializing hardware equipments of the electronic device; configuring the first processing unit for loading at least one library from the storage medium into the cache memory after initializing the hardware equipments of the electronic device, the at least one library being specified for use by the second processing unit; and configuring the second processing unit for booting a kernel of an operating system associated with the second processing unit after initializing the hardware equipments of the electronic device.

22 Claims, 4 Drawing Sheets

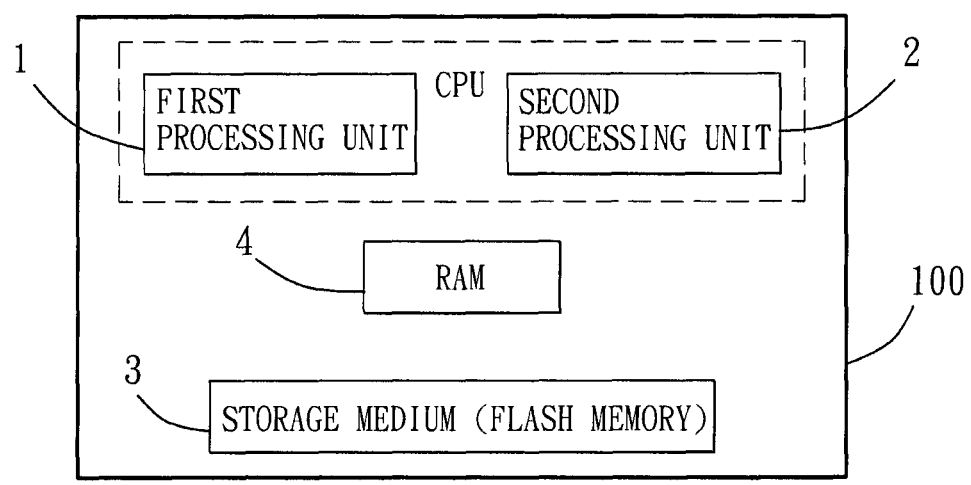
F I G. 2

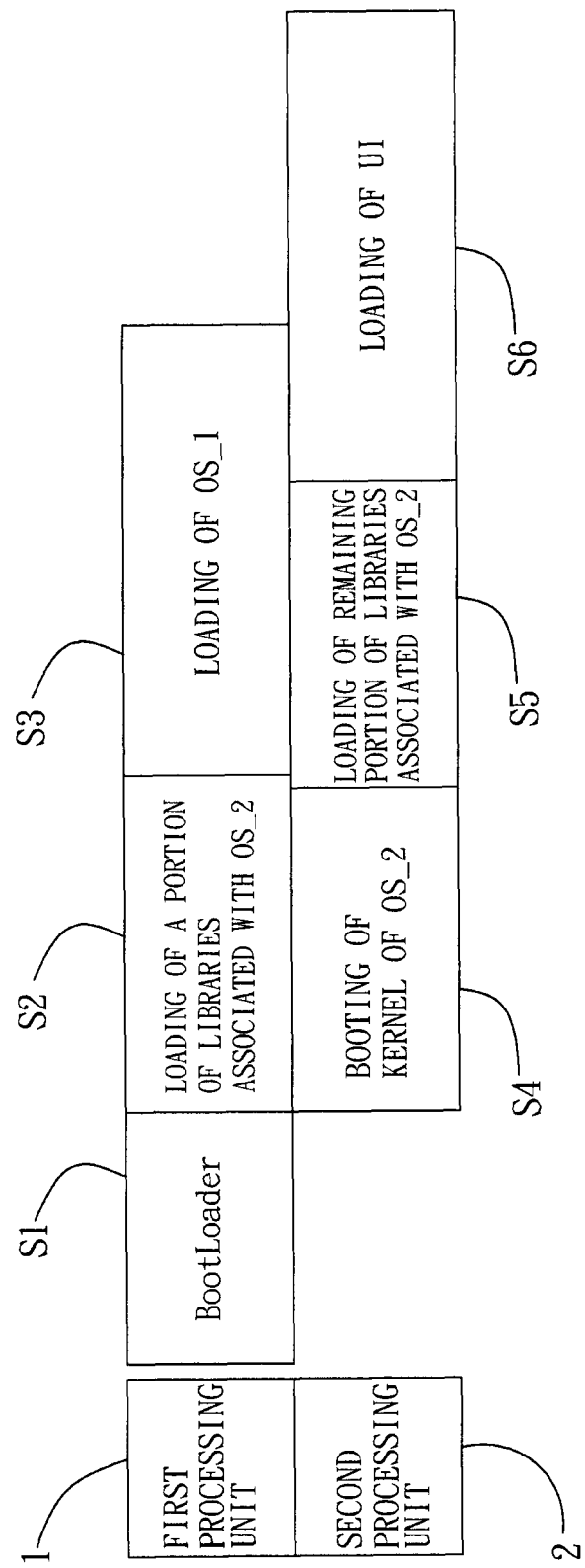
F I G. 3

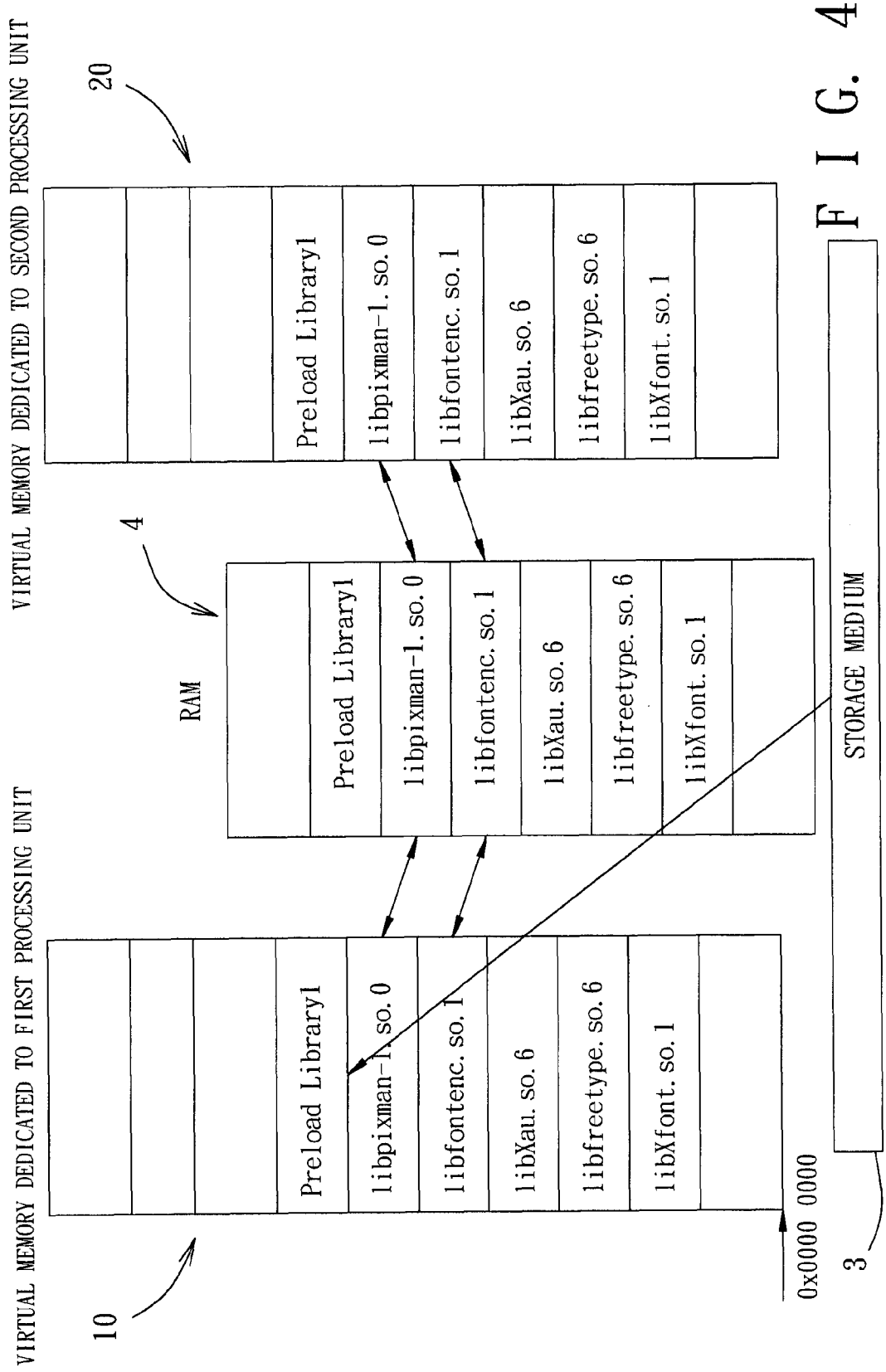

METHOD FOR BOOSTING AN ELECTRONIC DEVICE WITH MULTIPLE PROCESSING UNITS, AND ELECTRONIC DEVICE FOR IMPLEMENTING THE SAME

CROSS-REFERENCE TO RELATED APPLICATIONS

This application claims priority of Taiwanese Patent Application No. 099109875 filed on Mar. 31, 2010, the disclosures of which is incorporated herein by reference.

BACKGROUND OF THE INVENTION

1. Field of the Invention

The present invention relates to a method for booting an electronic device, more particularly to a method for speedily booting an electronic device with multiple processing units.

2. Description of the Related Art

As telecommunications technologies develop and become ubiquitous, handheld electronic devices, such as intelligent mobile phones, possess functions such as voice and data communications, and multimedia processing. Central Processing Units (CPU) of such electronic devices are required to process a large number of applications programs and multimedia files. In recent years, well-known chip manufacturers have been developing dual-core CPU architecture to improve computational efficiency.

An exemplary dual-core CPU architecture developed by Qualcomm employs a slower processor core, such as an ARM9 processor core with a clock rate ranging from 220 MHz to 529 MHz, and a faster processor core, such as an ARM11 processor core with a clock rate ranging from 800 MHz to 1000 MHz. The ARM9 processor core is for running a communication-dedicated operating system and for processing $3^{rd}$ generation (3G) communications protocols. The ARM11 processor core is for running an application-layer operating system (e.g., Windows Mobile or Linux).

Referring to FIG. 1, upon booting, the ARM9 processor core executes a boot loader in a first phase of initial operation. Main processing tasks that are included in the boot loader include initializing hardware equipments, and bringing software and hardware environments into an appropriate state. After completion of the first phase, the ARM9 processor core, on one hand, performs loading of an operating system (hereinafter referred to as the communication-dedicated operating system) that is mainly for processing of the 3 G communications protocols, and, on the other hand, executes instructions for notifying the ARM11 processor core to execute tasks of a second phase of initial operation, i.e., loading an application-layer operating system (using Linux as an example). Contents of the second phase include booting the Linux kernel, loading the libraries, and initializing all hardware peripherals, which generally require a processing time of approximately 20 seconds to complete. Next, the ARM11 processor core proceeds to a third phase of initial operation, i.e., initializing a graphical user interface (referred to as UI). However, design of a fine-looking UI generally implies an increase in size of program library to be loaded by the ARM11 processor core in the third phase, which subsequently lengthens the booting time.

Under the current booting mechanism, since processing time of the ARM11 processor core is much longer than processing time of the ARM9 processor core (i.e., loading of the communication-dedicated operating system), even though the ARM9 processor core has already loaded the communication-dedicated operating system, the ARM9 process or core is still unable to initiate communications-related operations and can only idle under the circumstances that the Linux operating system and the UI are yet to be loaded by the ARM11 processor core. Since users of the handheld electronic devices almost always want their handheld electronic devices to be ready-for-use immediately after power-on, several tens of seconds of booting time can be a very long wait to the users.

To alleviate the aforesaid problem of long booting time, a typical approach is to use a processor core with higher performance to thereby reduce the booting time. However, such an approach increases production cost.

SUMMARY OF THE INVENTION

Therefore, an object of the present invention is to provide a method to be implemented by an electronic device for reducing booting time. The electronic device includes first and second processing units, a cache memory, and a storage medium that has first and second operating systems stored therein.

Accordingly, a method of the present invention includes the steps of:

a) configuring the first processing unit for executing a set of program instructions for initializing hardware equipments of the electronic device;

b) configuring the first processing unit for loading at least one library from the storage medium into the cache memory after initializing the hardware equipments of the electronic device, said at least one library being specified for use by the second processing unit; and c) configuring the second processing unit for booting a kernel of an operating system associated with the second processing unit after initializing the hardware equipments of the electronic device.

Another object of the present invention is to provide an electronic device with reduced booting time.

Accordingly, an electronic device of the present invention includes: first and second processing units, a storage medium, and a cache memory.

The storage medium includes a set of program instructions for hardware equipment initialization, and at least one library specified for use by the second processing unit. The first processing unit is configured for executing the set of program instructions and for loading said at least one library specified for use by the second processing unit from the storage medium into the cache memory after completing the hardware equipment initialization.

The second processing unit is configured for booting a kernel of an operating system associated with the second processing unit after the first processing unit has completed the hardware equipment initialization.

Preferably, said at least one library specified for use by the second processing unit and loaded by the first processing unit into the cache memory includes at least one library associated with an application-layer operating system, and may further include at least one library associated with a graphical user interface.

Preferably, the electronic device is an embedded system, and the set of program instructions include instructions of a boot loader program. However, the present invention is not limited to embedded systems. In the case of computer systems, hardware equipment initialization is conducted with the use of a basic input/output operating system (BIOS).

Preferably, the boot loader program contains a predetermined list of libraries, and the first processing unit is configured to load said at least one library specified for use by the second processing unit into the cache memory according to the predetermined list of libraries.

Preferably, the first and second processing units are implemented using one of: a dual-core processor; two processor cores of a multi-core processor; and two processors.

The first processing unit, through implementing the method of the present invention, is configured via the boot loader program to preload libraries specified for use by the second processing unit, thereby reducing booting time of the electronic device, and thereby reducing waiting time of users.

BRIEF DESCRIPTION OF THE DRAWINGS

Other features and advantages of the present invention will become apparent in the following detailed description of the preferred embodiment with reference to the accompanying drawings, of which:

FIG. 2 is a functional block diagram of the preferred embodiment of an electronic device according to the present invention;

FIG. 3 is a diagram illustrating the preferred embodiment of a method for booting up an electronic device that includes two processing units and two operating systems, according to the present invention; and FIG. 4 is a diagram illustrating loading of libraries associated with one of the operating systems from a storage medium to a cache memory of the electronic device by one of the processing units.

DETAILED DESCRIPTION OF THE PREFERRED EMBODIMENT

Figure 1:
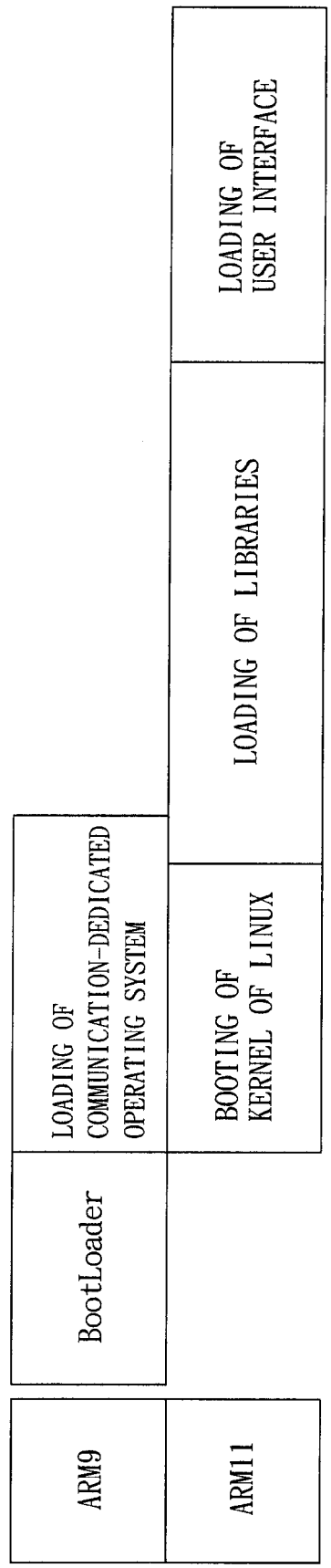
FIG. 1 is a diagram illustrating a conventional method for booting up a conventional electronic device that includes two processor cores and two operating systems.

Referring to FIG. 2, the preferred embodiment of an electronic device 100 of the present invention is exemplified as an embedded system having a plurality of processing units, which initialize hardware equipments of the electronic device 100 through a boot loader program or an integrated circuit (IC) having the same function. That the electronic device 100 has the plurality of processing units indicates that the electronic device 100 employs a dual-core central processing unit (CPU), a multi-core CPU, or multiple CPUs. The exemplary electronic device 100 of the present embodiment employs a dual-core CPU, and is described hereinafter.

The electronic device 100 includes a first processing unit 1, a second processing unit 2, a non-volatile storage medium (e.g., a flash memory) 3, and a cache memory (e.g., a random access cache memory) 4. The first and second processing units 1, 2 of the present embodiment are the processor cores in the dual-core CPU, respectively. The first processing unit 1 has relatively low computational capability, and has the functions of data processing and communication. The second processing unit 2 has relatively high computational capability, and is for processing various applications. However, the present invention is not limited to such, and may employ processor cores of the same performance.

The storage medium 3 has a boot loader program (i.e., a set of program instructions for hardware equipment initialization) stored therein, a communication-dedicated operating system (hereinafter referred to as "OS_1") that is mainly for processing of $3^{rd}$ generation (3G) communications protocols, and an application-layer operating system (e.g., Linux or Windows Mobile, hereinafter referred to as "OS_2"). Referring to FIGS. 3 and 4, when the electronic device 100 is powered on, the first processing unit 1 is configured to send a command for retrieving the boot loader program from the storage medium 3, to load the boot loader program from the storage medium 3 via a virtual memory 10 dedicated to the first processing unit 1, and to execute the boot loader program. Initialization of the hardware equipments is completed through execution of the boot loader program (step S1).

To avoid the situation that the first processing unit 1 loads OS_1 immediately after initialization of the hardware equipments such that the first processing unit 1 ends up waiting for the second processing unit 2, the boot loader program of the present embodiment further includes instructions for causing the first processing unit 1 to, after performing initialization of the hardware equipments, not only send a signal for notifying the second processing unit 2 to boot the kernel of OS_2 (step S4), but to also preload a portion of libraries associated with OS_2 with reference to a predetermined list of libraries. The aforesaid "a portion of libraries" refers to a portion of a plurality of libraries associated with the application-layer operating system. In practice, the first processing unit 1 may be configured to preload all of the libraries of the application-layer operating systems.

In the present embodiment, the predetermined list of libraries is contained in the boot loader program. When the first processing unit 1 reads the instructions for preloading the libraries, the first processing unit 1 will load the libraries that are included in the list of libraries from the storage medium 3. During preloading, the libraries from the storage medium 3 are stored at a first logical address in the virtual memory 10 dedicated to the first processing unit 1. In practice, during preloading, the libraries from the storage medium 3 are stored at a physical address in the cache memory 4 that can be mapped to the first logical address. The physical address can be further mapped to a second logical address in a virtual memory 20 that is dedicated to the second processing unit 2. The second logical address can be called upon for use by the second processing unit 2. Methods by which the first processing unit 1 loads the libraries into the cache memory 4 include "read ahead", "parse header", and "function or symbol relocation".

When the first processing unit 1 finishes preloading the libraries, it proceeds to loading of OS_1 (step S3).

The second processing unit 2 is configured to, after receiving from the first processing unit 1 the signal for booting the kernel of OS_2, determine whether shared libraries associated with OS_2 have already been loaded into the cache memory 4 by the first processing unit 1, and to load remaining libraries associated with OS_2 that have yet to be loaded if affirmative, thereby improving the overall loading speed (step S5). If the first processing unit 1 had already loaded all of the shared libraries, i.e., if OS_2 has no other libraries to be loaded, the second processing unit 2 will then skip step S5 and will proceed directly to step S6 to perform loading of the graphical UI.

In practice, the predetermined list of libraries includes all or a portion of the shared libraries associated with OS_2, depending on determination of system developers according to actual conditions. Factors that influence which libraries are included in the list of libraries include performance of each of the first and second processing units 1, 2, resource allocation, sizes of the libraries, loading time, etc. Loading time of OS_1 also needs to be taken into consideration during estimation of the overall booting time. It is worth noting that, in addition to preloading of the shared libraries associated with OS_2, the electronic device 100 of the present embodiment may also be configured for such that the first processing unit 1 preloads at least a portion of shared libraries associated with the graphical UI to thereby further improve the overall loading speed.

In summary, through configuring the first processing unit 1 to preload the shared libraries associated with OS_2, the second processing unit 2 requires a relatively shorter loading time to load libraries associated with OS_2, and loading of the UI can be done earlier, thereby reducing the overall boot up time of the electronic device 100.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for reducing booting time of an electronic device that includes a first processing unit, a second processing unit, a cache memory, and a storage medium, said method to be implemented by the electronic device, and comprising the steps of:

executing, by the first processing unit, a set of program instructions for initializing hardware equipment of the electronic device;

loading, by the first processing unit, a portion of the libraries from the storage medium into the cache memory after initializing the hardware equipment of the electronic device, wherein the first processing unit is adapted to execute a communication-dedicated operating system, the second processing unit is adapted to execute an application-layer operating system, and the storage medium includes libraries for use by the second processing unit, and wherein said portion of the libraries loaded by the first processing unit includes at least one library associated with the application-layer operating system; and during the loading of said portion of the libraries from the storage medium into the cache memory the first processing unit, booting, by the second processing unit, a kernel of the application-layer operating system after initializing the hardware equipment of the electronic device.

2. The method as claimed in claim 1, wherein said portion of the libraries loaded into the cache memory further includes at least one library associated with a graphical user interface.

3. The method as claimed in claim 1, wherein the set of program instructions include instructions of a boot loader program.

4. The method as claimed in claim 3, wherein the first processing unit loads said portion of the libraries into the cache memory according to a predetermined list of libraries contained in the boot loader program.

5. The method as claimed in claim 1, wherein the first processing unit sends a signal for notifying the second processing unit to boot the kernel of the application-layer operating system after initializing the hardware equipment of the electronic device.

6. The method as claimed in claim 1, further comprising the step of:

loading, by the first processing unit, the communication-dedicated operating system after loading said portion of the libraries into the cache memory.

7. The method as claimed in claim 1, further comprising the step of: loading, by the second processing unit, a remaining portion of the libraries for use by the second processing unit into the cache memory after booting the kernel of the application-layer operating system, the remaining portion of the libraries including at least one library associated with a graphical user interface.

8. The method as claimed in claim 7, further comprising the step of:

loading, by the second processing unit, the graphical user interface after loading the remaining portion of the libraries into the cache memory.

9. An electronic device comprising:

first and second processing units, said first processing unit being adapted to execute a communication-dedicated operating system and said second processing unit being adapted to execute an application-layer operating system;

a storage medium including a set of program instructions for hardware equipment initialization, and libraries for use by said second processing unit; and a cache memory;

said first processing unit being configured for executing the set of program instructions and for loading a portion of said libraries for use by said second processing unit from said storage medium into said cache memory after completing the hardware equipment initialization, said portion of said libraries loaded by said first processing unit including at least one library associated with said application-layer operating system;

said second processing unit being configured for booting a kernel of said application-layer operating system during loading of said portion of said libraries for use by said second processing unit from said storage medium into said cache memory after said first processing unit has completed the hardware equipment initialization.

10. The electronic device as claimed in claim 9, wherein said first and second processing units are implemented using one of: a dual-core processor; two processor cores of a multi-core processor; and two processors.

11. The electronic device as claimed in claim 9, wherein said portion of said libraries loaded by said first processing unit into said cache memory further includes at least one library associated with a graphical user interface.

12. The electronic device as claimed in claim 11, wherein said electronic device is an embedded system and the set of program instructions include instructions of a boot loader program.

13. The electronic device as claimed in claim 12, wherein said boot loader program contains a predetermined list of libraries, and said first processing unit is configured to load said portion of said libraries into said cache memory according to the predetermined list of libraries.

14. The electronic device as claimed in claim 9, wherein said first processing unit is configured to send a signal for notifying said second processing unit to boot said kernel of said application-layer operating system after completing the hardware equipment initialization.

15. The electronic device as claimed in claim 9, wherein said first processing unit is further configured to load the communication-dedicated operating system after loading said portion of said libraries into said cache memory.

16. The electronic device as claimed in claim 9, wherein: said second processing unit is configured to load a remaining portion of said libraries for use by said second processing unit into said cache memory after booting said kernel of said application-layer operating system, said remaining portion of said libraries including at least one library associated with a graphical user interface.

17. The electronic device as claimed in claim 16, wherein said second processing unit is further configured to load the graphical user interface after loading the remaining portion of said libraries into said cache memory.

18. The electronic device as claimed in claim 9, wherein said cache memory is a random access memory.

19. The method as claimed in claim 1, wherein a time period for booting the kernel of the application-layer operating system by the second processing unit and for loading the libraries into the cache memory only by the second processing unit is longer than a time period for loading the communication-dedicated operating system by the first processing unit.

20. The method as claimed in claim 19, wherein a time period for loading said portion of the libraries into the cache memory and loading the communication-dedicated operating system by the first processing unit, and for booting the kernel of the application-layer operating system and loading the remaining portion of the libraries into the cache memory by the second processing unit is shorter than the time period for booting the kernel of the application-layer operating system by the second processing unit and for loading the libraries into the cache memory only by the second processing unit.

21. The electronic device as claimed in claim 9, wherein a time period for booting the kernel of the application-layer operating system by the second processing unit and for loading the libraries for the application-layer operating system into the cache memory only by the second processing unit is longer than a time period for loading the communication-dedicated operating system by the first processing unit.

22. The electronic device as claimed in claim 21, wherein a time period for loading said portion of the libraries into the cache memory and loading the communication-dedicated operating system by the first processing unit, and for booting the kernel of the application-layer operating system and loading the remaining portion of the libraries into the cache memory by the second processing unit is shorter than the time period for booting the kernel of the application-layer operating system by the second processing unit and for loading the libraries into the cache memory only by the second processing unit.

\* \* \* \* \*

UNITED STATES PATENT AND TRADEMARK OFFICE
CERTIFICATE OF CORRECTION

PATENT NO.         : 9,003,174 B2                                    Page 1 of 1
APPLICATION NO.    : 13/071085
DATED              : April 7, 2015
INVENTOR(S)        : Cheng-Chia Lai It is certified that error appears in the above-identified patent and that said Letters Patent is hereby corrected as shown below:

Title page, item (54) Title: and in the Specification, in column 1 lines 1-2, please delete, "METHOD FOR BOO[[S]]TING AN ELECTRONIC DEVICE WITH MULTIPLE PROCESSING UNITS, AND ELECTRONIC DEVICE FOR IMPLEMENTING THE SAME"

and insert,

-- METHOD FOR BOOTING AN ELECTRONIC DEVICE WITH MULTIPLE PROCESSING UNITS, AND ELECTRONIC DEVICE FOR IMPLEMENTING THE SAME --

Signed and Sealed this
Twenty-ninth Day of September, 2015

Michelle K. Lee
*Director of the United States Patent and Trademark Office*